United States Patent [19]

Tomita et al.

[11] 4,026,766
[45] May 31, 1977

[54] FERMENTATION PROCESS

[75] Inventors: Koji Tomita, Kawasaki; Seikichi Kobaru, Narashino; Minoru Hanada, Tokyo; Hiroshi Tsukiura, Mitaka, all of Japan

[73] Assignee: Bristol-Myers Company, New York, N.Y.

[22] Filed: May 5, 1976

[21] Appl. No.: 683,585

[52] U.S. Cl. .................................................. 195/96
[51] Int. Cl.² ...................................... C12D 9/00
[58] Field of Search ........................ 195/80 R, 96

[56] References Cited
UNITED STATES PATENTS 3,143,468  8/1964  Herr et al. .................. 195/80 R

OTHER PUBLICATIONS

Merck Index, 8th Ed., p. 202.

*Primary Examiner*—Alvin E. Tanenholtz
*Assistant Examiner*—Robert J. Warden
*Attorney, Agent, or Firm*—David M. Morse

[57] ABSTRACT

A fermentation process for preparing capreomycin, a known antibiotic, employing a heretofore unknown microorganism is described, said microorganism being classified as a member of the genus Dactylosporangium and being herein named Dactylosporangium variesporum strain D409-5 (ATCC 31203).

4 Claims, No Drawings

FERMENTATION PROCESS

BACKGROUND OF THE INVENTION

1. Field of the Invention

This invention relates to a new microbiological process for preparation of the antituberculous antibiotic capreomycin.

2. Description of the Prior Art

Capreomycin is a known polypeptide antibiotic complex composed of four biologically active components designated as capreomycins IA, IB, IIA and IIB. Production of capreomycin by fermentation of *Streptomyces capreolus* has been described by Herr, et al. in U.S. Pat. No. 3,143,468. The capreomycin components have been characterized [Herr, et al., Annals of N.Y. Acad. Sci. 135: 940–946 (1966)], but their precise structural determination has not yet been established. A structure for capreomycin IB, the principal component of the capreomycin complex, has been proposed by Johnson, et al. in Nature 231: 301–302 (1971).

Capreomycin is reported to be active against a number of gram-positive and gram-negative bacteria but is of primary interest for its use as an antituberculosis agent.

SUMMARY OF THE INVENTION

The present invention relates to a new process for the preparation of capreomycin by aerobically cultivating a new microorganism designated herein as *Dactylosporangium variesporum* strain D409-5, ATCC 31203, or a capreomycin-producing mutant thereof, in an aqueous nutrient medium containing assimilable sources of carbon and nitrogen until a substantial amount of capreomycin is produced by said organism in said culture medium and, optionally, isolating said capreomycin from the culture medium. The invention also provides a process for producing as separate substances the antibiotic components of capreomycin designated capreomycin IA, IB, IIA and IIB, which process comprises producing capreomycin by the above-described fermentation procedure, separating the capreomycin complex from the culture medium, adsorbing the complex upon a chromatographic adsorbent and fractionally eluting the separate components from the adsorbent.

DETAILED DESCRIPTION

The novel capreomycin-producing organism *Dactylosporangium variesporum* strain D409-5, was isolated from an Indian soil sample. A culture of the organism has been deposited in the American Type Culture Collection, Washington, D.C. and added to its permanent collection of microorganisms as ATCC 31203.

For reasons given below strain D409-5 is considered to be a new species of the genus *Dactylosporangium*. Strain D409-5 forms finger-shaped sporangia singly, in pairs or in cluster on the surface of vegetative mycelium. The sporangium is usually straight, but occasionally it is bent and the sporulating site is swollen. Ordinary straight sporangium measures 1.2–1.6 by 4–7 $\mu$m. The sporangiophore is shorter than the length of the long axis of sporangium. Each sporangium contains one to five spores in a line. The spores show various shapes: spherical, oval, ellipsoidal, pyriform or diplococcus-like. The spores are motile and have a single, long polar flagellum. The sporangium was produced on yeast extract-malt extract agar but scarcely on the Czapek's and other agar media.

Aerial mycelium is generally not formed and, when formed, it is rudimental. Vegetative mycelium is branched, twisted and often singly coiled at the tip. The coiled mycelium twists with time and often develops to a sclerotium-like mass. Vegetative mycelium does not show fragmentation. It is gram-positive. Large globoses or sporangioles are formed in the vegetative mycelium embedded in the agar.

Cultural Characteristics

The growth is moderate on organic media and chemically defined media including Czapek's agar. Mass color of the vegetative mycelium is orange to light reddish brown. In case of poor growth, the color is creamy to light yellowish orange. A reddish orange diffusible pigment is produced in yeast extract-malt extract agar and Czapek's agar. Strain D409-5 forms no or rudimental aerial mycelium. The surface of colony is granular, plicate or crenate. The vegetative mycelium penetrates into the agar medium. The cultural characteristics of strain D409-5 are shown in Table 1.

Two spontaneous variants of strain D409-5 were recognized. One of them is a non-chromogenic variant which lacks the ability to produce orange pigment of the parent strain. The other is an aerial mycelium-forming variant which forms a distinct aerial mycelium on oat meal agar, tyrosine agar and two asparagine agars. The antibiotic productivity was low in the former variant but about the same with the latter as that of the original strain.

Physiological Characteristics

Strain D409-5 hydrolyzes casein and L-tyrosine, and produces hydrogen sulfide from L-cysteine. Litmus milk is completely peptonized and nitrate reduced to nitrite. Gelatin is not liquefied.

The strain is a strictly aerobic organism. The optimal growth temperature for the strain ranges from 32° to 39° C., and moderate growth is seen at 25° and 41° C. No growth is seen at 12° or at 48° C.

The physiological characteristics and carbohydrate utilization are shown in Tables 2 and 3.

Cell-wall Composition

The cell-wall components of strain D409-5 were investigated by the method of T. Yamaguchi in J. Bacteriol. 89 : 444–453 (1965). The cell-wall of strain D409-5 was found to contain meso-diaminopimelic acid, glutamic acid, alanine and aspartic acid as major amino acid components. Rhamnose, mannose and galactose were shown to be the major neutral sugar constituents.

The cell-wall composition of strain D409-5 is shown in Table 4 comparatively with that of three known actinomycetes species.

Taxonomy

On the basis of the above-described morphological, cultural and physiological characteristics, strain D409-5 has been classified as belonging to the genus *Dactylosporangium* in the family *Actinoplanaceae*. Two species under the genus *Dactylosporangium* have been reported to date: *Dactylosporangium aurantiacum* and *Dactylosporangium thallandense* [see Bergey's Manual of Determinative Bacteriology, 8th Edition, The Williams and Wilkins Co., Baltimore (1974)]. Strain D409-5 differs from *D. aurantiacum* in its growth color (orange pigmentation) on two asparagine agars, its poor growth on nutrient agar, its tyrosine-hydrolysis, its utilization of glycerol, D-ribose and inositol, and its negative utilization of L-rhamnose; it differs from *D. thailandense* in its poor growth on nutrient agar, its moderate growth on Czapek's agar, its negative gelatin-liquefaction, its nitrate reduction, its utilizations of glycerol and inositol, and its negative utilization of L-rhamnose. The comparison of strain D409-5 with the two above-mentioned *Dactylosporangium* species is summarized in Table 5.

Strain D409-5 was also compared with *Streptomyces capreolus*, the original producer of capreomycin described in Antimicrob. Agents and Chemoth.: 596–606 (1962). *S. capreolus* forms straight or flexuous sporophores with cylindrical conidia, while strain D409-5 forms finger-shaped sporangium with oligo-spores. The carbohydrate utilization of *S. capreolus* differs markedly from that of strain D409-5. In addition, strain D409-5 contains meso-DAP, aspartic acid, rhamnose, mannose and galactose as diagnostic cell-wall components which indicates that strain D409-5 is an actinomycetes species not belonging to the family *Streptomycetaceae*.

On the basis of the above findings, it is proposed that strain D409-5 be designated as *Dactylosporangium variesporum* sp. nov. The epithet *variesporum* derives from the fact that strain D409-5 bears various shapes of spores in the finger-shaped sporangium.

It is to be understood that for the production of capreomycin according to the present invention, limitation to the specific strain described above is not intended. It is especially desired and intended to include within the scope of this invention other capreomycin-producing strains of *Dactylosporangium variesporum* having the characteristics of ATCC 31203 or mutants thereof produced by known procedures such as irradiation with X-rays or ultraviolet light, treatment with nitrogen mustards, phage exposure, and the like.

Preparation of Capreomycin

Capreomycin may be prepared according to the present invention by cultivating a capreomycin-producing strain of *Dactylosporangium variesporum* having the identifying characteristics of ATCC 31203, or a capreomycin-producing mutant thereof, under submerged aerobic conditions in an aqueous nutrient medium. The organism is grown in a nutrient medium containing an assimilable carbon source, for example an assimilable carbohydrate. Examples of suitable carbon sources include glucose, galactose, fructose, mannose, sucrose, ribose, glycerol, soluble starch, and the like. The nutrient medium should also contain an assimilable nitrogen source such as, for example, fish meal, soybean meal, peptones, ammonium salts, yeast extract, etc. Nutrient inorganic salts may also be advantageously incorporated in the culture medium, and such salts may comprise any of the usual salts capable of providing sodium, potassium, ammonium, calcium, phosphate, sulfate, chloride, bromide, nitrate, carbonate or like ions.

Production of capreomycin can be effected at any temperature conducive to satisfactory growth of the organism, e.g. ~25°–41° C., and is conveniently carried out at a temperature of about 28°–30° C. Ordinarily, optimum production is reached in about 5–6 days.

Submerged aerobic culture conditions are the conditions of choice for the production of capreomycin. For preparation of relatively small amounts, shake flasks and surface culture can be employed, but for the preparation of large amounts, submerged aerobic culture in sterile tanks is preferred. The medium in the sterile tank can be inoculated with a sporulated suspension, but because of the growth lag experienced when a sporulated suspension is used as the inoculum, the vegetative form of the culture is preferred. Accordingly, it is desirable first to produce a vegetative inoculum of the organism by inoculating a relatively small quantity of culture medium with the spore form of the organism and, when a young active vegetative inoculum has been obtained, to transfer the vegetative inoculum aseptically to a large tank. The fermentation medium in which the vegetative inoculum is produced can be either the same as or different from the medium utilized for the large scale production of capreomycin.

The concentration of capreomycin in the fermentation medium can readily be followed during the course of the fermentation by testing samples of the culture for their inhibitory action against organisms known to be inhibited by capreomycin. One such assay organism is *B. subtillis* PCI 219 which can be employed in the well-known paper disc-agar plate assay technique.

After optimum broth potency has been obtained, the water-soluble capreomycin complex may be recovered from the culture medium by separation of the mycelia and undissolved solids by conventional means such as filtration or centrifugation. The capreomycin complex is recovered from the filtered or centrifuged broth by adsorption onto a cationic ion-exchange resin, preferably a resin of the Amberlite IRC-50 type in the ammonium form. The resin is then washed with water and the capreomycin eluted from the resin with a suitable eluant, e.g. pH 2 mineral acid solution. The active fractions are combined, adsorbed by activated carbon and eluted with pH 2 aqueous butanol. Following separation of the butanol layer, the aqueous layer is neutralized with a basic resin, for example Amberlite IR-45 in the hydroxyl form, to give effluent containing capreomycin in the free base form. The effluent is then concentrated in vacuo and lyophilized to give solid capreomycin free base.

The components comprising the capreomycin complex may, if desired, be obtained as single antibiotics by further purification of the complex, for example by column chromatographic techniques. Chromatography of the complex is possible over a variety of common adsorbents such as silica gel, alumina, carbon and the like. The preferred adsorbent is silica gel. The components are then eluted, preferably with a solvent system of 10% ammonium acetate: acetone: 10% ammonium hydroxide (95:100:5). The active fractions are collected and fractions containing the same component are combined, desalted, concentrated and lyophilized to give capreomycins IA, IB, IIA, and IIB. The components may be further purified if desired by conventional procedures such as chromatography, counter-current distribution or partition between various solvents.

Capreomycin may be converted to acid addition salts by conventional methods such as those described in U.S. Pat. No. 3,143,468.

Capreomycin obtained by the method of the present invention exhibits characteristics identical to those of the known antibiotic as described in the literature.

The following examples are offered only for the purposes of illustrating the present invention and are not intended to limit same in any respect. "Amberlite" is a registered trademark of the Rohm and Haas Company. Amberlite IRC-50 and CG-50 mentioned below are the trade names for weakly acidic cationic exchange resins of a carboxylicpolymethacrylic type. Amberlite IR-45 is the trade name for a weakly basic anion exchange resin having a chloromethylated polystyrene-divinylbenzene matrix.

EXAMPLES

EXAMPLE 1

A culture of *Dactylosporangium variesporum*, strain D409-5, is produced by growing the organism at 37° C. on an MY agar slant having the following composition:

| | | |
|---|---|---|
| Malt extract | 1 | % |
| Yeast extract | 0.4 | % |
| Glucose | 0.4 | % |
| Agar | 1.6 | % |
| $CaCO_3$ | 0.05 | % | and a pH of 7.3.

The agar slant so-produced was used to inoculate a vegetative medium having the following composition:

| | | |
|---|---|---|
| Soybean meal | 3 | % |
| Corn starch | 2 | % |
| $MgSO_4 \cdot 7H_2O$ | 0.33 | % |
| $CaCO_3$ | 1.0 | % |

The vegetative culture was incubated at 28° C. for 2 days on a rotary shaker operating at 250 rpm. A 2 ml. portion of the culture was transferred to 100 ml. of fermentation medium having in a 500 ml. Erlenmeyer flask, the fermentation medium having the same composition as the vegetative medium. The progress of the fermentation was followed by the paper disc-agar plate assay using *B. subtilis* PCI 219 as the test organism. The antibiotic production reached a maximum of 500 mcg./ml. in 5–6 days (pH 8.2).

The harvested broth was filtered and the bioactivity in the filtrate adsorbed at pH 7 with Amberlite IRC-50 ($NH_4^+$). The resin was washed with water and eluted with HCl solution at pH 2. The active fractions were combined, adsorbed by carbon and eluted with aqueous butanol at pH 2. The butanol layer was separated and the aqueous layer neutralized with Amberlite IR-45 ($OH^-$), concentrated *in vacuo* and lyophilized to give a light brown solid which was determined to be capreomycin free base. The thin layer chromatography and bioautography showed the presence of four bioactive components.

For the separation of each component, the crude solid complex was purified by silica-gel chromatography with a solvent system of 10% ammonium acetate: acetone: 10% ammonium hydroxide (95:100:5). The first active fractions were collected, desalted by carbon chromatography, concentrated *in vacuo* and lyophilized to give a mixture of minor components, capreomycin IIA and IIB. Similarly, the second active fractions gave major component capreomycin IB and the third fractions gave capreomycin IA.

Capreomycin IB was further purified by chromatography on a column of Amberlite CG-50 ($NH_4^+$) saturated with 0.6 M ammonium acetate buffer at pH 9, being eluted with the same buffer solution. Active fractions were collected, desalted by carbon adsorption and eluted with aqueous butanol adjusted to pH 2 with $H_2SO_4$. The active eluate was concentrated in vacuo and precipitated with methanol to give capreomycin IB disulfate as a white amorphous powder. The other components were purified in a similar manner.

TABLE 1

| | Cultural Characteristics of Strain D409-5 | | |
|---|---|---|---|
| Medium | Growth | Color of mycelial mass | Diffusible pigment |
| Sucrose-nitrate agar (Czapek's agar) | Moderate, plicate localized rudimental white aerial mycelium | Deep yellowish orange to vivid orange | Light olivacious yellow or light brownish orange |
| Glucose-asparagine agar | Moderate, crenate | Deep yellowish orange | Light yellow |
| Glycerol-asparagine agar | Moderate, crenate | Light reddish brown | Pale brownish yellow |
| Starch-mineral salts agar | Poor to moderate, crenate | Light reddish brown | Light yellow |
| Tyrosine agar | Moderate, plicate, faint grayish white aerial mycelium in some part of growth | Light yellowish brown | Light brownish yellow |
| Nutrient agar | Poor, granular | Creamy to light orange | Pale brownish yellow |
| Yeast extract-malt extract agar | Abundant, crenate | Light reddish orange | Deep reddish orange |
| Oat meal agar | Moderate, crenate | Pale yellow to light reddish orange | Pale yellow to light reddish orange |
| Peptone-yeast-iron agar | Poor, granular | Colorless to light yellowish orange | Pale brownish yellow |
| Potato agar | Abundant, granular | Deep reddish orange | None |

TABLE 2

Physiological Reactions of Strain D409-5

| Test | Response | Method and Medium |
|---|---|---|
| Nitrite from nitrate | Positive | Inorganic medium: Czapek's sucrose nitrate broth |
|  | Weakly positive to negative | Organic medium: 0.5% yeast extract, 1.0% glucose, 0.5% KNO$_3$, 0.1% CaCO$_3$ |
| Sodium chloride tolerance | Moderate growth and pigmentation at 0.5% NaCl. Restricted growth and no pigmentation at 1.5–4% NaCl. No growth at 5% NaCl. | Basal medium: 1% yeast extract, 2% soluble starch, 1.5% agar |
| Effect of pH: Potato plug acidity tolerance test | With CaCO$_3$ (pH: 6.5): Abundant growth with deep orange pigmentation. Without CaCO$_3$ (pH: 5.9): Moderate or somewhat restricted growth and pigmentation | Luedemann's potato agar |
| Casein hydrolysis in agar medium | Strongly positive (5–8 mm hydrolysed band after 7 days) | Luedemann's agar medium |
| Reactions in skimmed milk solution | Coagulated and completely peptonized |  |
| Gelatin stab | Not liquified |  |
| H$_2$S production from L-Cysteine | Positive | L-Cysteine (0.1%) added to tryptone-yeast extract broth (ISP No. 1 medium) plus agar. H$_2$S detected with a paper strip containing 10% aq. lead-acetate solution. |
| Hydrolysis of tyrosine | Positive | L-Asparagine was omitted from the tyrosine agar so as to include L-tyrosine as a sole nitrogen source. |
| Formation of melanoid | Negative | Tyrosine agar and peptone-yeast-iron agar. |
| Effect of temperature | Maximal growth at 32–39° C. Moderate growth at 25° C. and 41° C. Scant growth at 18° C. and 45° C. No growth at 12° C. and 48° C. | Yeast extract-malt extract agar |

TABLE 3

Carbohydrate Utilization of Strain D490-5

| | PG* | Lm** |
|---|---|---|
| Glycerol | + | ++ |
| D(−)-Arabinose | − | ± |
| L(+)-Arabinose | + | ++ |
| D-Xylose | + | ++ |
| D-Ribose | + | ++ |
| L-Rhamnose | − | − |
| D-Glucose | + | ++ |
| D-Galactose | + | ++ |
| D-Fructose | + | ++ |
| D-Mannose | + | ++ |
| L(−)-Sorbose | − | − |
| Sucrose | + | ++ |
| Lactose | −∼± | + |
| Cellobiose | + | ++ |
| Melibiose | ++ | ++ |
| Trehalose | + | ++ |
| Raffinose | + | ++ |
| D(+)-Melezitose | − | − |
| Soluble starch | + | ++ |
| Cellulose | − | − |
| Dulcitol | − | − |
| Inositol | + | ++ |
| D-Mannitol | + | ++ |
| D-Sorbitol | − | − |
| Salicin | −∼± | − |

*PG=Pridham-Gottlieb's inorganic medium
**Lm=Luedemann's organic medium as referred to in Intl. J. Syst. Bacteriol. 21: 240-247, 1971.

TABLE 4

Cell-wall Compositions of Strain D490-5 and Three Actinomycetes Species

| | Strain D409-5 | Micromonospora chalcea | Streptomyces fradiae | Nocardia corallina |
|---|---|---|---|---|
| LL-DAP | − | TR | ++ | − |
| meso-DAP | ++ | ++ | − | ++ |
| glycine | TR* | ++ | ++ | − |
| glutamic acid | ++ | ++ | ++ | ++ |
| alanine | +++ | +++ | +++ | +++ |
| aspartic acid | + | − | − | TR |
| arabinose | − | − | − | +++ |
| rhamnose | + | − | − | + |
| mannose | +++ | TR | TR | +++ |
| galactose | +++ | TR | − | +++ |
| glucose | − | − | − | − |
| glucosamine | ++ | ++ | ++ | + |

*TR=Trace

TABLE 5

Comparison of Strain D409-5 with Two Species of Genus Dactylosporangium

| | Strain D409-5 | D. aurantiacum | D. thailandense |
|---|---|---|---|
| Cultural Characteristics: | | | |
| Glucose-asparagine agar | Moderate growth, light yellowish orange | Moderate growth, smooth and flat, whitish cream in color | Moderate growth, light orange |
| Nutrient agar | Poor growth, creamy to light | Good growth, orange | Good growth, pale orange |

TABLE 5-continued

Comparison of Strain D409-5 with Two Species of Genus Dactylosporangium

| | Strain D409-5 | D. aurantiacum | D. thailandense |
|---|---|---|---|
| Czapek's agar | orange Moderate growth, deep yellowish orange to vivid orange | | No growth |
| Physiological Characteristics: | | | |
| Hydrolysis of L-tyrosine | Positive | Negative | Positive |
| Liquefaction of gelatin | Negative | Negative | Positive |
| Reduction of nitrate | Positive | Positive | Negative |
| Carbohydrate Utilization: | | | |
| Glycerol | + | − | − |
| D-Ribose | + | − | + |
| L-Rhamnose | − | + | + |
| Inositol | + | − | − |

TABLE 6

Comparison of Strain D409-5 and Streptomyces capreolus

| | Strain D490-5 | Streptomyces capreolus |
|---|---|---|
| Sporulation | One to five spores in finger-shaped sporangium | Spore-chain straight or flexuous form |
| Aerial mycelium | None or rudimental | Sparse or none |
| Color of vegetative mycelium | Orange to light reddish brown | Orange to reddish brown |
| Peptonization of skim-milk | Positive | Negative |
| Nitrate reduction | Positive | Negative |
| Gelatin-liquefaction | Not liquefied | Slowly liquefied |
| Carbohydrate utilization | | |
| D-Xylose | + | − |
| D-Ribose | + | − |
| Sucrose | + | − |
| Trehalose | + | − |
| Raffinose | + | − |
| Mannitol | + | − |

We claim:

1. A process for the production of capreomycin which comprises aerobically cultivating *Dactylosporangium variesporum* strain D409-5 having the identifying characteristics of ATCC 31203, or a capreomycin-producing mutant thereof, in an aqueous nutrient medium containing assimilable sources of carbon and nitrogen until a substantial amount of capreomycin is produced by said organism in said culture medium.

2. A process according to claim 1 wherein the organism is *Dactylosporangium variesporum* ATCC 31203.

3. A process according to claim 1 which includes the additional step of isolating capreomycin from the culture medium.

4. A method for producing as separate substances capreomycin IA, IB, IIA and IIB which comprises aerobically cultivating *Dactylosporangium variesporum* strain D409-5 having the identifying characteristics of ATCC 31203 or a capreomycin-producing mutant thereof, in an aqueous nutrient medium containing assimilable sources of carbon and nitrogen until a substantial amount of capreomycin is produced by said organism in said culture medium, separating the capreomycin complex from the culture medium, adsorbing the complex upon a chromatographic adsorbent and fractionally eluting the separate components from the adsorbent.

* * * * *